United States Patent
Hirano et al.

(10) Patent No.: US 12,027,784 B2
(45) Date of Patent: Jul. 2, 2024

(54) ANTENNA DEVICE

(71) Applicant: NEC Platforms, Ltd., Kawasaki (JP)

(72) Inventors: Shun Hirano, Kanagawa (JP); Masato Tsuchiya, Kanagawa (JP); Shinya Yamamoto, Osaka (JP); Raita Nakanishi, Osaka (JP); Tomoyuki Kuge, Osaka (JP)

(73) Assignee: NEC Platforms, Ltd., Kawasaki (JP)

( * ) Notice: Subject to any disclaimer, the term of this patent is extended or adjusted under 35 U.S.C. 154(b) by 167 days.

(21) Appl. No.: 17/794,498

(22) PCT Filed: Dec. 25, 2020

(86) PCT No.: PCT/JP2020/048814
§ 371 (c)(1),
(2) Date: Jul. 21, 2022

(87) PCT Pub. No.: WO2021/153132
PCT Pub. Date: Aug. 5, 2021

(65) Prior Publication Data
US 2023/0084290 A1   Mar. 16, 2023

(30) Foreign Application Priority Data

Jan. 30, 2020  (JP) .................................. 2020-013473

(51) Int. Cl.
*H01Q 9/16* (2006.01)
*G01S 19/35* (2010.01)
(Continued)

(52) U.S. Cl.
CPC ............. *H01Q 5/378* (2015.01); *G01S 19/35* (2013.01); *H01Q 1/28* (2013.01); *H01Q 1/38* (2013.01); *H01Q 9/16* (2013.01)

(58) Field of Classification Search
CPC  H01Q 5/378; H01Q 1/28; H01Q 1/38; H01Q 9/16; G01S 19/35
See application file for complete search history.

(56) References Cited

U.S. PATENT DOCUMENTS

| 4,864,320 A | * | 9/1989 | Munson | ................. | H01Q 19/06 343/834 |
| 2011/0248895 A1 | * | 10/2011 | Bungo | ..................... | H01Q 9/42 343/702 |
| 2019/0319334 A1 | | 10/2019 | Dai | | |

FOREIGN PATENT DOCUMENTS

| CN | 1734836 A | 2/2006 |
| CN | 1925216 A | 3/2007 |

(Continued)

OTHER PUBLICATIONS

Ahmad A. Salih et al., "Design of a compact GNSS Antenna for Vehicular Applications", 2016 8th International Conference on Communication Systems and Networks, 2018 IEEE International Conference on Electro/Information Technology, Oct. 22, 2018, pp. 0759-0763.

(Continued)

*Primary Examiner* — David E Lotter
(74) *Attorney, Agent, or Firm* — Sughrue Mion, PLLC

(57) ABSTRACT

An antenna device includes a printed circuit board including a circuit configured to determine a position based on a navigation signal, and a dipole antenna element mounted on the printed circuit board and configured to receive the navigation signal. Further, the antenna device includes an L-shaped parasitic antenna element, wherein the dipole antenna element and a long-side element of the L-shaped parasitic antenna element are placed parallel to each other but at a position not in line with each other, and an end of (Continued)

a short-side element of the L-shaped antenna element is placed in close proximity to an end of the dipole antenna element.

3 Claims, 5 Drawing Sheets

(51) Int. Cl.
*H01Q 1/28* (2006.01)
*H01Q 1/38* (2006.01)
*H01Q 5/378* (2015.01)

(56) References Cited

FOREIGN PATENT DOCUMENTS

| CN | 102956973 A | 3/2013 |
|---|---|---|
| CN | 104769771 A | 7/2015 |
| CN | 205863408 U | 1/2017 |
| JP | 2003-110329 A | 4/2003 |
| JP | 2004-242277 A | 8/2004 |
| JP | 2007-068106 A | 3/2007 |
| JP | 2007-096680 A | 4/2007 |
| JP | 2011-130002 A | 6/2011 |
| JP | 2012-500395 A | 1/2012 |
| JP | 2014-522595 A | 9/2014 |
| JP | 2016-010042 A | 1/2016 |
| TW | 200304249 | 9/2003 |

OTHER PUBLICATIONS

Swetba Amit et al., "Design of Compact Bent Dipole Antenna and its Array with High Gain performance for GPS Application", 2016 8th International Conference on Communication Systems and Networks (COMSNETS), Mar. 24, 2016, pp. 1-6.

International Search Report of PCT/JP2020/048814 dated Mar. 16, 2021 [PCT/ISA/210].

Chinese Office Action dated Nov. 10, 2023 in Chinese Application No. 202080094958.5.

Office Action dated Sep. 12, 2023 in Japanese Application No. 2020-013473.

\* cited by examiner

ANTENNA DEVICE

CROSS REFERENCE TO RELATED APPLICATIONS

This application is a National Stage of International Application No. PCT/JP2020/048814, filed Dec. 25, 2020, claiming priority to Japanese Patent Application No. 2020-013473, filed Jan. 30, 2020, the contents of all of which are incorporated herein by reference in their entirety.

TECHNICAL FIELD

The present invention relates to an antenna device and, for example, relates to an in-vehicle navigation satellite antenna device.

BACKGROUND ART

When a vehicle such as an automobile receives GPS (Global Positioning System) radio waves, an antenna mounted on the vehicle needs to be reduced in size. For example, Patent Literature 1 discloses an antenna device including a parasitic antenna element that is placed at a position parallel to and in a direction in line with a feed antenna element.

On the other hand, in order for an in-vehicle device to have a built-in antenna for receiving radio waves transmitted from a GNSS (Global Navigation Satellite System), a ceramic patch antenna is mounted in parallel to a board surface of a component mounting board of the in-vehicle device in some cases.

However, the ceramic patch antenna is able to receive radio waves only on one side of the antenna. Thus, when the ceramic patch antenna is mounted on a board, radio waves are receivable only one side of the board.

CITATION LIST

Patent Literature

PTL1: Japanese Unexamined Patent Application Publication No. 2016-10042

SUMMARY OF INVENTION

Technical Problem

In this manner, when installing the in-vehicle device that incorporates the component mounting board into a vehicle, it is necessary to install it in consideration of a GPS signal receiving surface by the ceramic patch antenna, and therefore the position and direction of installing the device into the vehicle are limited.

In view of the above described problems, an object of the present disclosure is to provide an antenna device that solves the problem of the limited installation position and direction in a vehicle.

Solution to Problem

An antenna device according to one example embodiment includes a printed circuit board including a circuit configured to determine a position based on a navigation signal, and a dipole antenna element mounted on the printed circuit board and configured to receive the navigation signal.

Advantageous Effects of Invention

According to the present invention, the installation position and direction in a vehicle are not limited, which allows an increase in directions where signals are received at low cost and high gain in an in-vehicle device.

EXAMPLE EMBODIMENT

An example embodiment of the present invention will be described hereinafter with reference to the drawings.

Example Embodiment

Figure 1:
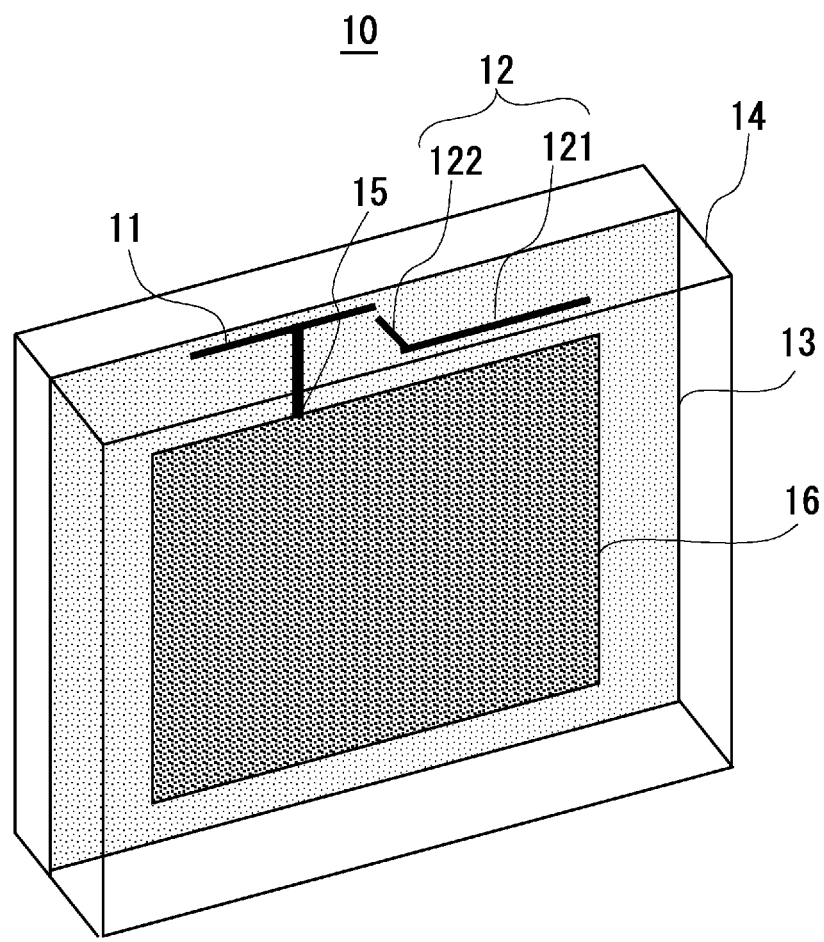
FIG. 1 is a perspective view showing a schematic structure of an antenna device according to this example embodiment.
Figure 1:
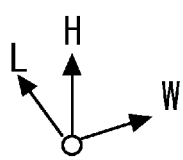

FIG. 1 is a perspective view showing a schematic structure of an antenna device according to this example embodiment. In FIG. 1, an antenna device 10 includes a dipole antenna element 11, an L-shaped antenna element 12, a printed circuit board 13, a housing 14, and a printed circuit board GND 16.

The dipole antenna element 11 is an antenna element where two linear conductor wires extend symmetrically from a feeding point 15. The two linear conductor wires of the dipole antenna element 11 are placed parallel to one side of the printed circuit board GND 16, at a position spaced from the printed circuit board 13. The two linear conductor wires of the dipole antenna element 11 are connected to a circuit of the printed circuit board 13 through the feeding point 15.

The L-shaped antenna element 12 is an antenna element where two linear conductor wires are connected at their ends at an angle of approximately 90 degrees. Further, the L-shaped antenna element 12 is a parasitic antenna element that is not connected to the circuit of the printed circuit board 13. One conductor wire 121 of the two linear conductor wires of the L-shaped antenna element 12 is placed parallel to one side of the printed circuit board 13, at a position spaced from the printed circuit board 13. The conductor wire 121 is placed at a position parallel to each other but a position not in line with the dipole antenna element 11. In other words, the conductor wire 121 is placed not to overlap the dipole antenna element 11 when viewed in the L-axis direction in FIG. 1. An end of the other conductor wire 122 of the two linear conductor wires is placed in close proximity to the dipole antenna element 11.

Specifically, the L-shaped antenna element 12 is placed in such a way that one end of the conductor wire 122 is connected to one end of the conductor wire 121, and the other end of the conductor wire 122 is spaced from but close enough to the dipole antenna element 11 so as to be electromagnetically coupled to the dipole antenna element 11 and affects the directivity of the dipole antenna element 11. Further, for example, the other conductor wire 122 of the two linear conductor wires is placed perpendicular to the principal surface of the printed circuit board 13.

The printed circuit board 13 is a board that is connected to the dipole antenna element 11 and includes a circuit that measures the position of the antenna device 10 from a positioning signal (e.g., a GNSS signal) received by the dipole antenna element 11. Since the printed circuit board 13 is not connected to the L-shaped antenna element 12, the L-shaped antenna element 12 acts as a parasitic antenna element. The printed circuit board GND 16 is a rectangular metal layer formed on one side of the printed circuit board 13, for example, and it is a layer with a reference potential. Further, the printed circuit board GND 16 may be formed on any layer of a multilayer substrate.

The housing 14 is a hollow housing that accommodates the dipole antenna element 11, the L-shaped antenna element 12, and the printed circuit board 13. Further, the L-shaped antenna element 12 is formed on a side surface of the housing 14.

Figure 2:
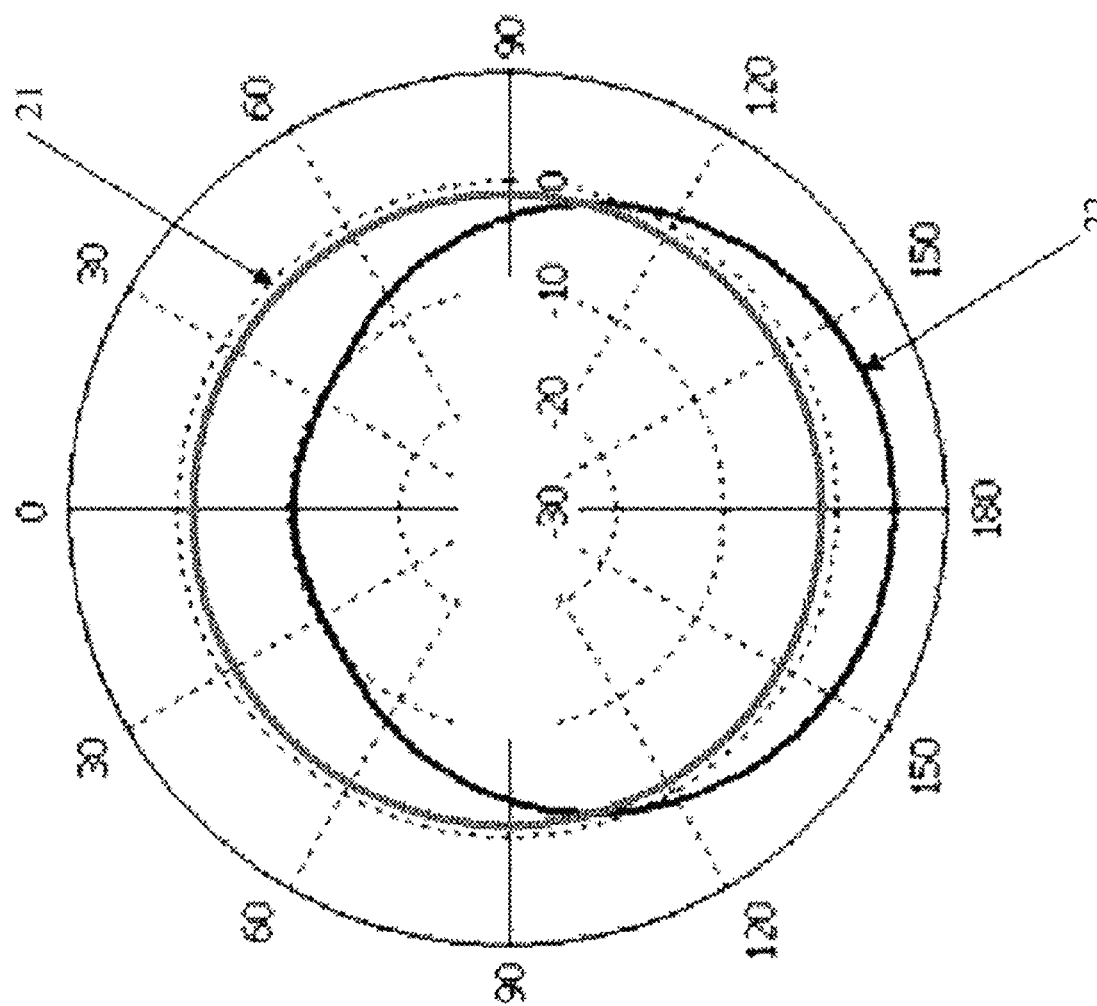
FIG. 2 is a view showing the directivity of the antenna device according to this example embodiment.

FIG. 2 is a view showing the directivity of the antenna device according to this example embodiment. FIG. 2 shows the directivity in a vertical plane (the HL plane in FIG. 1) of the antenna device 10 and a patch antenna for comparison. In FIG. 2, a directivity pattern 21 indicates the directivity in the vertical plane of the antenna device 10, and a directivity pattern 22 indicates the directivity in the vertical plane of the patch antenna.

As shown in FIG. 2, the reception range of the antenna device 10 is larger than that of the patch antenna.

An example of mounting the antenna device 10 on a vehicle is described hereinafter. The antenna device 10 is preferably placed upright inside an instrument panel of a vehicle so that the dipole antenna element 11 formed on the printed circuit board 13 is on the topside of the vehicle in the vertical direction.

Figure 3:
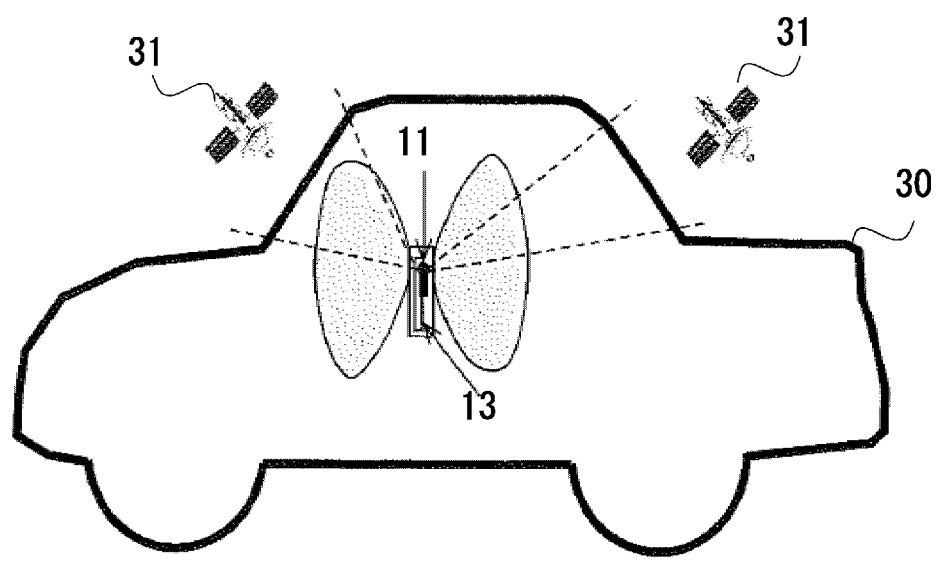
FIG. 3 is a schematic view showing an example of a vehicle with an on-board antenna device according to this example embodiment.
Figure 3:
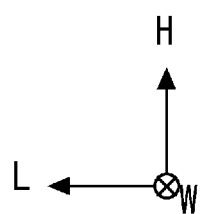

FIG. 3 is a schematic view showing an example of a vehicle with an on-board antenna device according to this example embodiment. In FIG. 3, a vehicle 30 with an on-board antenna device is an example in which the antenna device 10 is placed upright so that the dipole antenna element 11 formed on the printed circuit board 13 is on the topside in the vertical direction and the traveling direction of the vehicle and the principal surface of the printed circuit board 13 are perpendicular to each other.

As shown in FIG. 3, since the antenna device 10 mounted on the vehicle 30 with the on-board antenna device has the directivity in the traveling direction and in the opposite direction to the traveling direction, it is capable of receiving navigation signals from navigation satellites 31 overhead in the traveling direction and in the opposite direction to the traveling direction.

Figure 4:
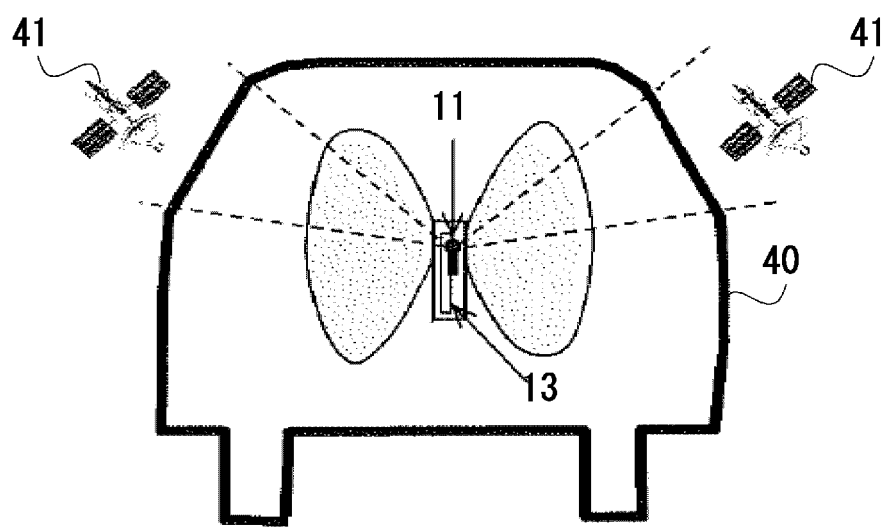
FIG. 4 is a schematic view showing an example of a vehicle with an on-board antenna device according to this example embodiment.
Figure 4:
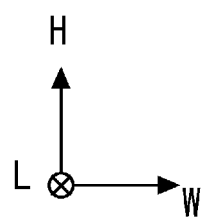

FIG. 4 is a schematic view showing an example of a vehicle with an on-board antenna device according to this example embodiment. In FIG. 4, a vehicle 40 with an on-board antenna device is an example in which the antenna device 10 is placed upright so that the dipole antenna element 11 formed on the printed circuit board 13 is on the topside in the vertical direction and the traveling direction of the vehicle and the principal surface of the printed circuit board 13 are parallel to each other.

As shown in FIG. 4, since the antenna device 10 mounted on the vehicle 40 with the on-board antenna device has the directivity in the direction orthogonal to the traveling direction (i.e., the left and right directions when viewed in the traveling direction), it is capable of receiving navigation signals from navigation satellites 41 overhead in the left and right directions when viewed in the traveling direction.

Figure 5:
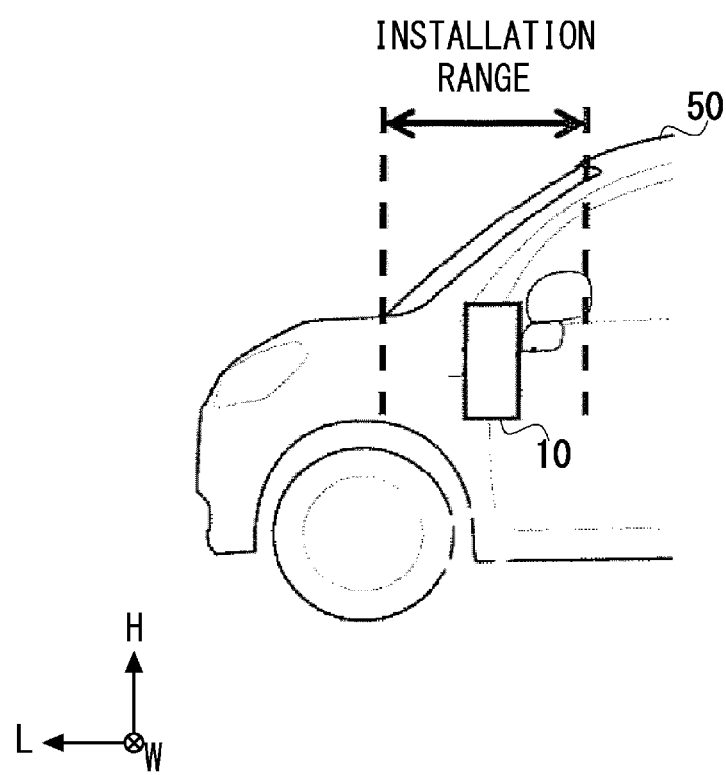
FIG. 5 is a view showing an installation range of the antenna device in a vehicle with an on-board antenna device according to this example embodiment.

FIG. 5 is a view showing an installation range of an antenna device in a vehicle with an on-board antenna device according to this example embodiment. As shown in FIG. 5, the antenna device 10 is preferably installed inside an instrument panel of a vehicle 50 with an on-board antenna device and in a windshield mounting surface.

In the installation range shown in FIG. 5, since a windshield is on the front side, the directivity pattern in the travelling direction is not disturbed by a metal such as a pillar.

As described above, according to an antenna device of this example embodiment, since a dipole antenna has directivity in a direction perpendicular to an antenna element, it also has directivity in a direction perpendicular to a component pattern-formed surface of a printed circuit board, which enhances the receiving sensitivity of GNSS signals in the perpendicular direction and thereby prevents the receiving sensitivity from decreasing when an in-vehicle device is placed upright in a vehicle. Further, according to an antenna device in a vehicle with an on-board antenna device of this example embodiment, with use of an L-shaped contactless parasitic antenna, a front end of a short side of the L-shaped antenna and one end of the dipole antenna are electromagnetically coupled, and the receiving sensitivity is enhanced in cooperation with the L-shaped parasitic antenna.

As a result, according to the antenna device of this example embodiment, since the dipole antenna is formed on one end face of the printed circuit board of the in-vehicle device, the directivity is improved compared with a patch antenna, which allows GNSS signals to be received from the front, back, left and right of the vehicle, and therefore signals are receivable from a large number of GNSSs, so that the vehicle position is more accurately recognizable.

Note that the present invention is not limited to the above-described example embodiment and can be modified as appropriate without departing from the spirit and scope of the present disclosure. For example, both of the antenna device 10 placed as shown in FIG. 3 and the antenna device 10 placed as shown in FIG. 4 may be included.

REFERENCE SIGNS LIST

10 ANTENNA DEVICE
11 DIPOLE ANTENNA ELEMENT
12 L-SHAPED ANTENNA ELEMENT
13 PRINTED CIRCUIT BOARD
14 HOUSING
15 FEEDING POINT
16 PRINTED CIRCUIT BOARD GND
30, 40 VEHICLE WITH ON-BOARD ANTENNA DEVICE
121 CONDUCTOR WIRE
122 CONDUCTOR WIRE

The invention claimed is:
1. An antenna device comprising:
a printed circuit board including a circuit configured to determine a position based on a navigation signal;
a dipole antenna element mounted on the printed circuit board and configured to receive the navigation signal; and
a parasitic antenna element comprising a first element and a second element, the length of which is shorter than the length of the first element, wherein the dipole antenna element and the first element of the parasitic antenna element are placed parallel to each other but at a position not in line with each other, and an end of the second element of the parasitic antenna element is placed in close proximity to an end of the dipole antenna element.

2. The antenna device according to claim 1, wherein an end of the first element of the parasitic antenna element and an end of the second element of the parasitic antenna element are connected to each other, and the first element of the parasitic antenna element and of the second element of the parasitic antenna element are orthogonal to each other.

3. The antenna device according to claim 2, further comprising:

a housing configured to accommodate the printed circuit board, the dipole antenna element, and the parasitic antenna element, wherein the parasitic antenna element is formed on a side surface of the housing.

* * * * *